June 2, 1959     P. LANG ET AL     2,889,181
ANTI-FRICTION BEARING UNIT
Filed Nov. 29, 1955     3 Sheets-Sheet 1
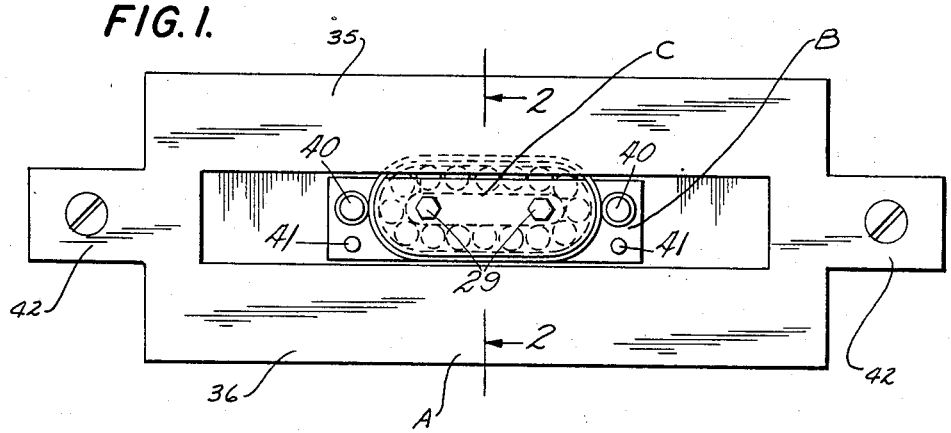
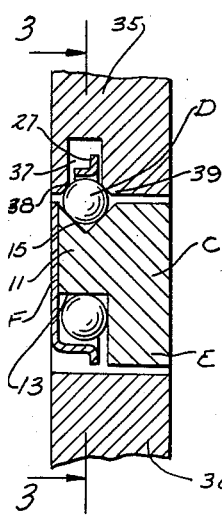
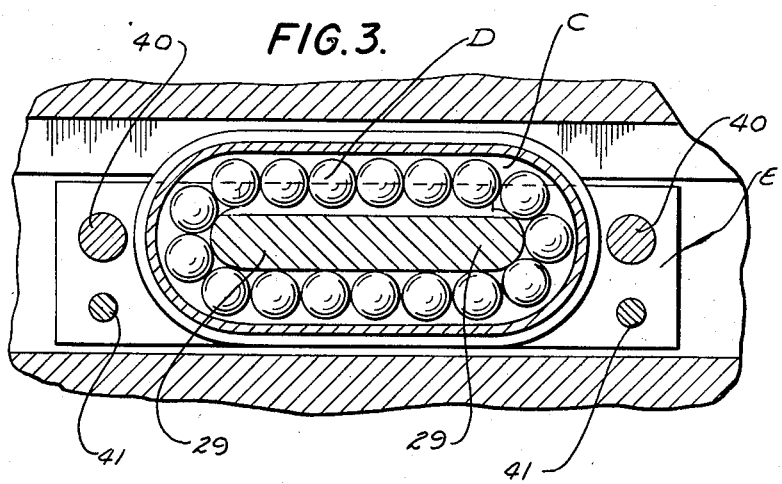
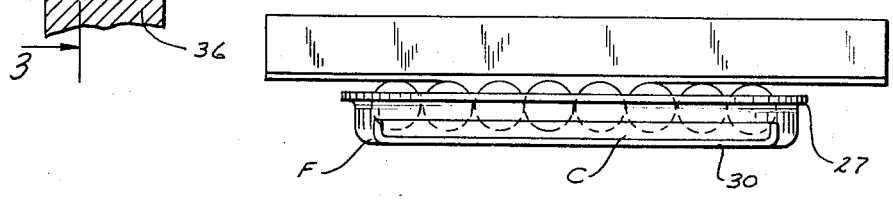
INVENTOR.
PAUL LANG
FREDERICK VICIK
BY
ATTORNEY June 2, 1959  P. LANG ET AL  2,889,181
ANTI-FRICTION BEARING UNIT
Filed Nov. 29, 1955  3 Sheets-Sheet 2

INVENTOR.
PAUL LANG
FREDERICK VICIK
BY
ATTORNEY

June 2, 1959 P. LANG ET AL 2,889,181
ANTI-FRICTION BEARING UNIT
Filed Nov. 29, 1955 3 Sheets-Sheet 3

INVENTOR.
PAUL LANG
FREDERICK VICIK
BY
ATTORNEY

United States Patent Office 2,889,181
Patented June 2, 1959

2,889,181

ANTI-FRICTION BEARING UNIT

Paul Lang, Katonah, and Frederick Vicik, Tuckahoe, N.Y., assignors to M. Ten Bosch, Inc., Pleasantville, N.Y., a corporation of New York Application November 29, 1955, Serial No. 549,688

2 Claims. (Cl. 308—6)

The present invention relates to a novel anti-friction bearing unit, and it particularly relates to a novel ball-bearing unit.

It is among the objects of the present invention to provide a novel ball-bearing slide unit which can achieve low friction and may be readily assembled, dismantled and inspected without losing balls.

Another object is to provide a novel low friction slide unit which will give low friction sliding action with a unitary sub-ball assembly which may be readily assembled or dismantled without any danger of losing balls, and with accurate adjustment to remove back-lash and back-play.

According to the present invention there is provided a ball or roller sub-assembly in which the balls are held in place by means of a base structure and retainer element, and in which the ball assembly may be readily slid into position into the guide to permit linearly movable low friction bearing structures.

In the preferred form of the invention the ball carrier unit consists of a basic runway having an upper and lower passageway for the balls with a plate or cup member while exposing the surface of the balls for sliding movement nevertheless will hold the balls in position in the runway base.

The relatively linearly element will then ride on opposite portions of the sides of the balls while the balls will undergo the circulatory movement.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a front elevational view of one type of unit showing the linear bearing in position.

Fig. 2 is a transverse vertical sectional view upon the line 2—2 of Fig. 1.

Fig. 3 is a transverse sectional view upon the line 3—3 of Fig. 2.

Fig. 4 is a top edge view of the central ball-bearing sliding element removed from the bearing structure of Fig. 1.

Referring to Figs. 1 to 8 there is shown two relatively linear moving structures A and B with the interior loop moving structure B having the ball-bearing unit C.

The ball-bearing unit C has the balls D, the base E and the cup retainer F.

Figures 8, 9:
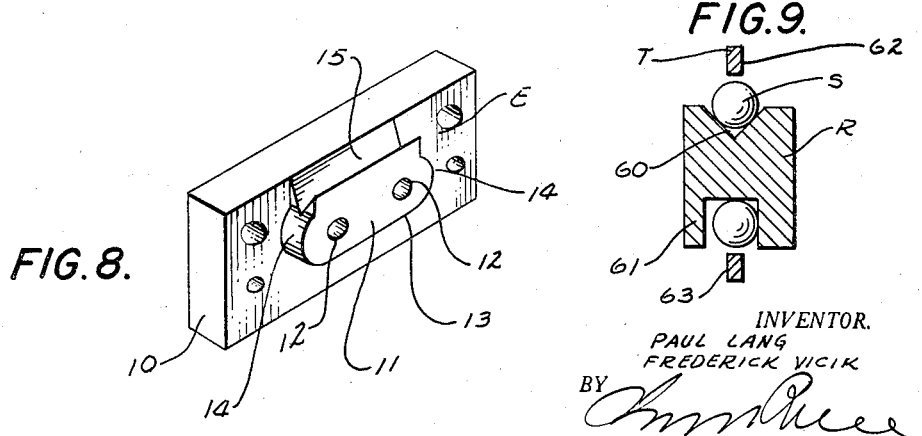
Fig. 8 is a top perspective view of the ball carrier base arrangement.
Fig. 9 is a transverse sectional view similar to Fig. 2 of an alternative arrangement.

As shown in Fig. 8 the base structure may consist of a rectangular block 10 having the forwardly projecting portion 11, having the screw holes 12.

The projecting portion 11 has a bottom guideway surface 13, the end circular guideway surfaces 14 and the top groove runway 15.

As shown by reference to Fig. 2 the balls will ride in the top grooves 15 around the curved ends 14 and then under the lower face 13.

Figure 5:
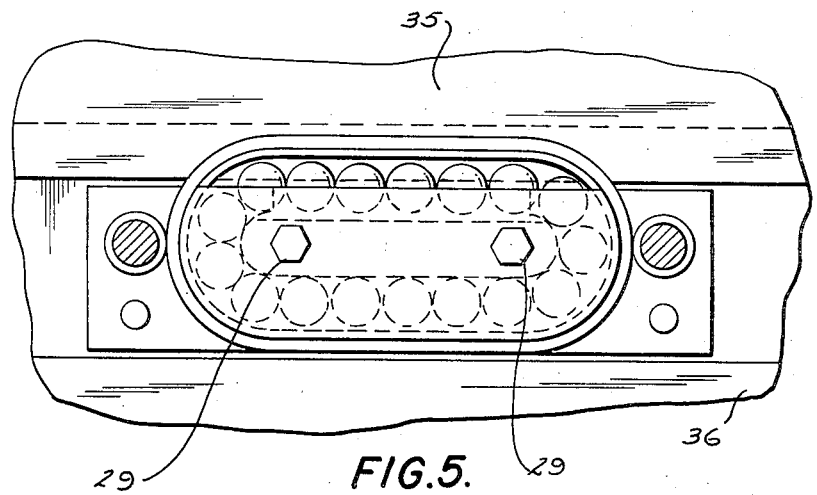
Fig. 5 is a front plan view similar to Fig. 3 showing the entire cup in position covering the balls.
Figures 6, 7:
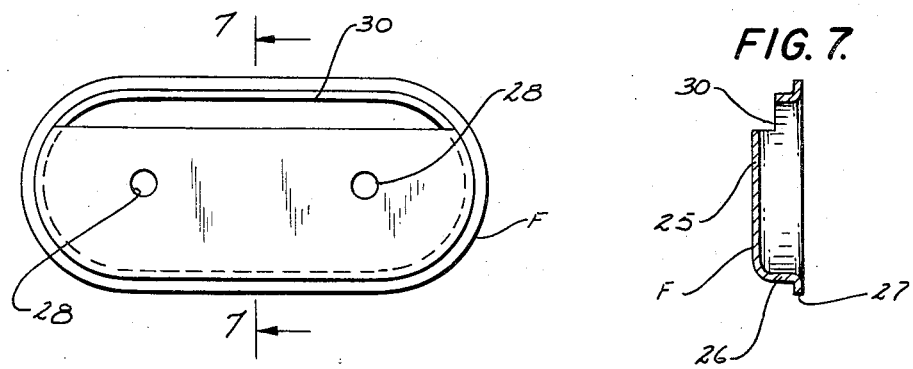
Fig. 6 is a front view of the cover removed from the structure as shown in Figs. 1 to 5.
Fig. 7 is a transverse vertical sectional view upon the line 7—7 of Fig. 6.

The cup structure, shown best in Figs. 6 and 7 has a base 25 with the side flange 26 and the edge lip 27. The openings 28 will receive the bolts 29 and the recess 30 will expose the forward edges of the balls D.

It will be noted that the peripheral side flange 26 will hold the balls D in position in their circulatory travel.

The outer element A, as shown in Fig. 2, has an upper structure 35 and a lower structure 36. This upper structure 35 may have a recess 37 with the corners 38 and 39 riding upon the side edges of the balls D.

The outer element A as shown in front view in Fig. 1 and in sectional view in Fig. 2 has an upper portion 35 and a lower portion 36 which are integrally joined together on each end of the rectangular opening through which projects the cup retainer F.

The upper flange 26 and its lip 27 above the recess 30 will be received in the groove or slot 37, as best shown in Fig. 2.

The balls will thus ride under the edge 38 and 39 and in the grooves 15 carrying the fixed structure A in its relative linear movement in respect to the inside structure B.

The inside structure B may be connected by bolts 40 and studs 41 to other structures and the outside structure A may also be connected by bolts or screws 42 to other structures.

It will be particularly noted after the removal of the outer structure A by removing the screws 42, that the entire unit may be readily removed or disassembled by removal of the connections 40 and 41 without any danger of loss of balls or rollers, and that the unit consisting of the base member E, the cup F and the balls or rollers D will consist of a convenient, insertable or dismountable ball-bearing unit which will form a linear anti-friction bearing.

The screws or bolts 29 hold the cup F in position on the structure E.

In the alternative form shown in Fig. 9, the base structure R carries the balls S which are held in position by the ring or annulus T.

The basic structure R has a groove 60 for the upper ball runway and it has a lower recess 61 for the lower ball runway. The upper section 62 and the lower section 63 will hold the balls 9 in position in said runways.

The unit C of Figs. 1 and 9 may be readily assembled and removed in view of the fact that as shown in Fig. 2 the lower portion may be canted outwardly or inwardly to remove the balls D from contact with the corners 38 and 39 which ride on the side edges of the balls. The clearance between the bottom of the member C and the top of the structure 36 is sufficient for this purpose. The securing members 29 extend through the openings 28 into the projecting portion 11. The member 35 is shown slightly modified in Fig. 5 as compared to Fig. 1 so that the assembly including the member F will more clearly appear, the forward edge of the track 35 will normally project in front of the balls D so that they will not be apparent except in dotted lines as shown in Fig. 1.

The ball-bearing as shown will give an accurately guided linear anti-friction sliding movement with the balls being removable as a single unit with the base and retainer structure.

Figure 10:
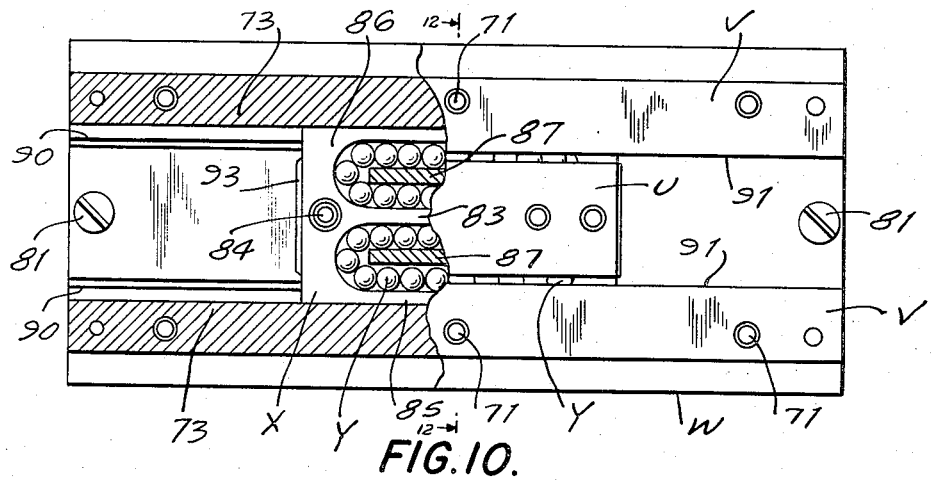
Fig. 10 is a front elevational view partly in section of an alternative double race ball slide arrangement.
Figure 11:
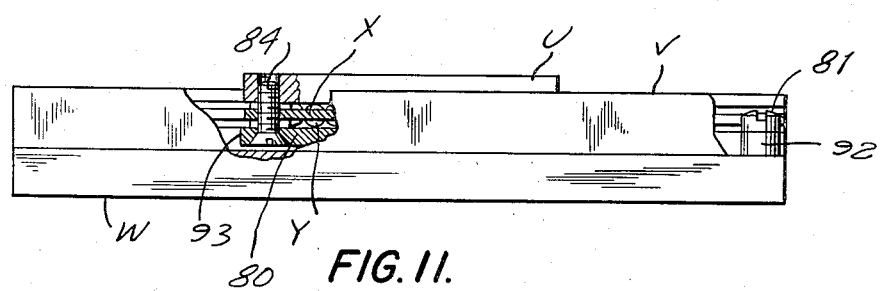
Fig. 11 is an edge view partly in section showing the mounting thereof.
Figure 12:
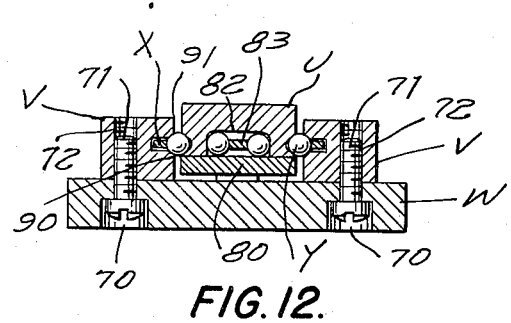
Fig. 12 is a transverse vertical sectional view taken upon the line 12—12 of Fig. 10.

Referring to the embodiment of Figs. 10, 11 and 12, there is shown a base structure W having the recesses 70 into which the bolts 71 are inserted.

The plates V may be removed from each side of the retainer element X, which is a single plate, by removing the bolts 71. The screws 81 may mount the base plate W upon other structure or elements not shown.

The bolts 71 will screw into the tapped opening 72 in the top plates V. The top plates V will consist of strips 73 which extend the full length of the base plate W.

The inside faces 90 of the top plates V or strips 73 will have recesses which receive the retainer element X. The retainer element X will enclose the balls Y of the two races, which balls on their other faces will be held in position by means of their downwardly extending portions 87 of the center plate U.

The center plate U carries the bottom plate 80 by means of the bolts or screws 84. The bottom plate 80 will hold the balls Y in position in their raceways on their sides of the upper plate U and in the recesses 82.

The retainer plate X has outer portions 86 and a central portion 83. The center portion 83 of the retainer plate X will extend between the rows of balls in the recess 82.

The sleeve 92 and the bolt or screw 81 will act as stops and will be contacted by the ends 93 of the cover plate 80.

The double ball race of Figs. 10 and 11 will similarly give an accurately guided linear anti-movement with the ball unit being removable as a single unit.

The removable ball race unit will consist of the retainer plate X, the bottom cover plate 80 and the balls Y.

While there has herein been illustrated and described the preferred embodiment of the invention, it is to be understood that applicants do not limit themselves to the precise construction herein disclosed, and the right is reserved to all changes and modifications coming within the scope of the invention as defined in the appended claims.

Having now particularly described and ascertained the nature of the invention, and in what manner the same is to be performed, what is claimed is:

1. An anti-friction linear ball bearing assembly including an inside bearing base having separated spaced elongated parallel linear runways and semi-circular end runways connecting said linear runways, bearing balls in side by side relationship extending entirely around and substantially filling said runways, an enclosure extending entirely around and over said runways and enclosing said balls and holding them in position in said runways in side by side relationship, said enclosure along one of said runways extending across the middle portions of the outer portions of the balls positioned in said one runway and leaving the outer sides of the balls for bearing contact and an outer bearing structure, bearing on said balls at the outer sides thereof.

2. The assembly of claim 1, said one runway having a groove to contact the inner sides of the balls in the base and also having a groove to contact the outer sides of the balls in the bearing structure, said groove in the bearing structure receiving the enclosure between said last mentioned outer sides of the balls.

References Cited in the file of this patent

UNITED STATES PATENTS

| | | |
|---|---|---|
| 719,951 | Norwood | Feb. 3, 1903 |
| 1,069,261 | Kail | Aug. 5, 1913 |
| 1,750,140 | Thompson | Mar. 11, 1930 |